(12) United States Patent
Ishii

(10) Patent No.: US 8,330,658 B2
(45) Date of Patent: Dec. 11, 2012

(54) PORTABLE COMMUNICATION DEVICE

(75) Inventor: Junichi Ishii, Tokyo (JP)

(73) Assignee: NEC Corporation, Tokyo (JP)

( * ) Notice: Subject to any disclaimer, the term of this patent is extended or adjusted under 35 U.S.C. 154(b) by 311 days.

(21) Appl. No.: 12/672,626

(22) PCT Filed: Oct. 17, 2008

(86) PCT No.: PCT/JP2008/068823
§ 371 (c)(1),
(2), (4) Date: Feb. 8, 2010

(87) PCT Pub. No.: WO2009/051211
PCT Pub. Date: Apr. 23, 2009

(65) Prior Publication Data
US 2011/0095962 A1    Apr. 28, 2011

(30) Foreign Application Priority Data
Oct. 18, 2007   (JP) .................. 2007-270853

(51) Int. Cl.
*H01Q 1/24* (2006.01)
(52) U.S. Cl. ...................... 343/702; 343/876
(58) Field of Classification Search .............. 343/702, 343/876; 455/575.1, 575.4, 575.7
See application file for complete search history.

(56) References Cited

U.S. PATENT DOCUMENTS

| 7,609,212 B2 * | 10/2009 | Sato et al. ............ 343/702 |
| 7,830,313 B2 * | 11/2010 | Isoda et al. ........... 343/702 |
| 2005/0239416 A1 | 10/2005 | Shimizu |

FOREIGN PATENT DOCUMENTS

| EP | 1432067 A2 | 6/2004 |
| JP | 2002217755 A | 8/2002 |
| JP | 2004500741 A | 1/2004 |
| JP | 2005354420 A | 12/2005 |
| JP | 2006303719 A | 11/2006 |
| JP | 3961526 B | 5/2007 |
| JP | 2007201918 A | 8/2007 |
| WO | 0211231 A1 | 2/2002 |
| WO | 2007018146 A | 2/2007 |
| WO | 2009034648 A1 | 3/2009 |

OTHER PUBLICATIONS

International Search Report for PCT/JP2008/068823 mailed Jan. 27, 2009.
Extended European search report for EP08839533.0 dated May 29, 2012.

* cited by examiner

*Primary Examiner* — Hoang V Nguyen

(57) ABSTRACT

A portable communication device includes a first housing and a second housing that are slidably placed one on another and can shift between an open state and a closed state, a wireless circuit installed in the first housing, a first antenna installed in the second housing, and a noncontact switching member that connects together the first antenna and the wireless circuit in a noncontact manner in the open state and disconnects the noncontact between the first antenna and the wireless circuit in the closed state.

7 Claims, 14 Drawing Sheets

PORTABLE COMMUNICATION DEVICE

This application is the National Phase of PCT/JP2008/068823, filed Oct. 17, 2008, which is based upon and claims the benefit of priority from Japanese patent application No. 2007-270853 filed on Oct. 18, 2007, the disclosure of which is incorporated herein in its entirety by reference.

TECHNICAL FIELD

The present invention relates to a portable communication device and, more particularly, to a portable communication device wherein a first housing and a second housing are slidably movable relative to each other between an open state wherein both the housings have a minimum overlapped area and a closed state wherein both the housings have a maximum overlapped area.

BACKGROUND ART

In recent years, portable communication devices having a variety of housing structures are developed. Among others, a portable communication device has been developed wherein two housings are slidably moved in parallel with respect to each other in an overlapped state thereof. An example of the portable communication device having such a slidably-moving mechanism will be described with reference to FIG. 11 to FIG. 14. FIG. 11 to FIG. 14 are longitudinal-sectional views of a portable communication device having the slidably-moving mechanism.

The structure of the portable communication device will be described with reference to FIG. 11 and FIG. 12. FIG. 11 shows a closed state wherein a pair of housings have a maximum housing-overlapped area, whereas FIG. 12 shows an open state wherein the pair of housings in pair have a minimum housing-overlapped area. In the communication device, the front housing 110 disposed on the front side, i.e., shown at the top side in the drawing and the rear housing 120 disposed on the rear side, i.e., shown at the bottom side in the drawing are coupled together by a slide mechanism 130. The front housing 110 includes an LCD unit 111 on the front side of the housing, and a printed circuit board 112 and a first antenna 113 connected to the printed circuit board 112 within the housing. The rear housing 120 includes a keyboard 121 on the front side of the housing, and includes within the housing a battery 126, printed circuit boards 122, 125, a wireless circuit 124 mounted on the printed circuit board 122, and a second antenna 123 connected to the printed circuit board 122 and wireless circuit 124 within the housing. The printed circuit board 112 disposed in the front housing 110 and the printed circuit board 122 disposed in the rear housing 120 are connected together by a flexible printed cable (FPC) 131. The wireless circuit 124 installed in the rear housing 120 and the first antenna 113 installed in the front housing 110 are connected together by a coaxial cable 132.

In operation of the above device, the wireless circuit 124, upon communicating to an external device, typically inputs/outputs signals via the second antenna 123. If the user performs a keystroke etc. in the open state of the housings effected by the slide mechanism 130, a portion of the housing including the second antenna 123 is covered by the hand. In this state, there arises the problem that the communication characteristic of the second antenna 123 significantly deteriorates. In order to avoid such a problem, the portable communication device shown in FIGS. 11 and 12 uses the first antenna 113 provided in the front housing 110 if the user performs a keystroke etc. More specifically, the connection point of the wireless circuit 124 is switched from the second antenna 123 to the first antenna 113.

However, in the above structure, the coaxial cable 132 passing through the slide mechanism 130 is required to have a higher bending endurance in view of the stress applied thereto by a bend. A lower loss is also required between the first antenna 113 and the wireless circuit 124. Thus, it is needed for the coaxial cable 132 to have a sufficiently larger size for achieving the lower loss in the coaxial cable 132. However, if the coaxial cable 132 having a larger diameter passes through the slide mechanism 130, the slide mechanism 130 must have a larger thickness, thereby causing a difficulty in designing a smaller and thinner structure. In addition, the coaxial cable 132 having a larger diameter has a larger resistance with respect to the bending, and accordingly, a slide movement of the front housing 110 requires a larger effort to thereby cause a degraded operability of the slide mechanism.

In order to solve the above problem, a portable communication device shown in FIGS. 13 and 14 is known. FIG. 13 shows the closed state wherein the overlapped area of the pair of housings is the maximum, whereas FIG. 14 shows the open state wherein the overlapped area of the pair of housings is the minimum. In the portable communication device shown in those drawings, the front housing 210 disposed on the front side of the device and the rear housing 220 disposed on the rear side of the device are coupled by the slide mechanism 230. The front housing 210 includes an LCD unit 211 on the front side of the device and a printed circuit board 212 within the device. The rear housing 220 includes a keyboard 221 on the front side of the device, and includes within the device a battery 226, printed circuit boards 222, 225, a wireless circuit 224 mounted on the printed circuit board 222, a first antenna 213 and a second antenna 223 which are connected to the printed circuit board 222 and the wireless circuit 224. The printed circuit board 212 disposed in the front housing 210 and the printed circuit board 222 disposed in the rear housing 220 are connected together by an FPC 231.

The portable communication device shown in FIGS. 13 and 14 employs a configuration wherein the first antenna 213 is disposed in the rear housing 220 at the position opposing the second antenna 223, and thus the coaxial cable does not pass through the slide mechanism 230, differently from the portable communication device shown in FIGS. 11 and 12. However, when the slide mechanism 230 is in an open state, the first antenna 213 installed in the rear housing 220 is covered by the slide mechanism 230 and the printed circuit board 212 installed in the front housing 210. In this case, there arises a problem in that the communication performance of the antenna is inferior as compared to the case where the antenna having the same volume is installed in the front housing 210. In addition, installation of the first antenna 213 in the rear housing 220 causes another problem in that the mounting area of the substrate 125 must be reduced in order for maintaining a volume equivalent to the volume of the rear housing 120 shown in FIGS. 11 and 12.

Patent Publication-1 discloses a technique for improving the communication characteristic of the antenna. In this patent publication, a pair of terminals that are in contact with each other in the open state of the housings is provided between the first housing and the second housing that slidably move with respect to each other. One of the terminals is connected to the printed circuit board within the first housing, whereas the other of the terminals is connected to the printed circuit board within the second housing. In this configuration, Patent Publication-1 uses the antenna installed within the first housing when the pair of housings are in the closed state. In the open state, the configuration is such that the terminals in pair connect together the printed circuit board in the first housing and the printed circuit board in the second housing, whereby the antenna installed in the second housing is used therein.

Patent Publication-1: JP-2006-303719A

DISCLOSURE OF THE INVENTION

Problem to be Solved by the Invention

However, in the configuration disclosed in Patent Publication-1 as described above, there is a possibility that the terminals in pair that contact each other for switching the antenna are liable to abrasion due to iterated contact and isolation occurring during each slide of the housings. This may result in an unstable communication due to an imperfect contact, thereby causing a necessity of replacing contact parts in some cases.

In view of the above, it is an object of the present invention to provide a portable communication device that is free from the above problem, i.e., abrasion of the terminals of the member for switching the antenna, and thus is capable of stabilizing the communication state.

Means for Solving the Problem

The present invention provides a portable communication device including: a first housing and a second housing placed one on another; a slide mechanism that allows the second housing to slidably move relative to the first housing between an open state wherein both the housings have a minimum overlapped area and a closed state wherein both the housings have a maximum overlapped area; a wireless circuit installed in the first housing; a first antenna installed in the second housing; a noncontact switching member that connects together the first antenna and the wireless circuit by a noncontact connection in the open state, and disconnects the noncontact connection at least in the closed state.

EFFECT OF THE INVENTION

In accordance with the portable communication device of the present invention, terminals of the noncontact switching member that connects together the first antenna and the wireless circuit is free from abrasion thereby capable of stabilizing the communication state.

BEST MODES FOR CARRYING OUT THE INVENTION

The present invention may employ a configuration wherein a portable communication device includes: a first housing and a second housing placed one on another; a slide mechanism that allows the second housing to slidably move relative to the first housing between an open state wherein both the housings have a minimum overlapped area and a closed state wherein both the housings have a maximum overlapped area; a wireless circuit installed in the first housing; a first antenna installed in the second housing; a noncontact switching member that connects together the first antenna and the wireless circuit by a noncontact connection in the open state, and disconnects the noncontact connection at least in the closed state.

In the above configuration, since the noncontact switching member connects together the first antenna and the wireless circuit by a noncontact connection in the open state, and disconnects the noncontact connection at least in the closed state, terminals of the noncontact switching member are not liable to ablation upon iterated connection and disconnection between the wireless circuit and the first antenna that is effected by the slide movement of the housings. Thus, the iterated connection and disconnection between the wireless circuit and the first antenna by using the slide movement of the housings does not cause an unstable connection, thereby achieving a stable communication state in the portable communication device.

Hereinafter, the concrete configuration of the portable communication device according to the present invention will be described with reference to embodiments of the present invention. Although a portable telephone terminal will be exemplified as an example of the portable communication device, the portable communication device may be of any type, such as PDA, so long as the portable communication device includes a portable information processor having a communication function.

<First Embodiment>

Figure 1:
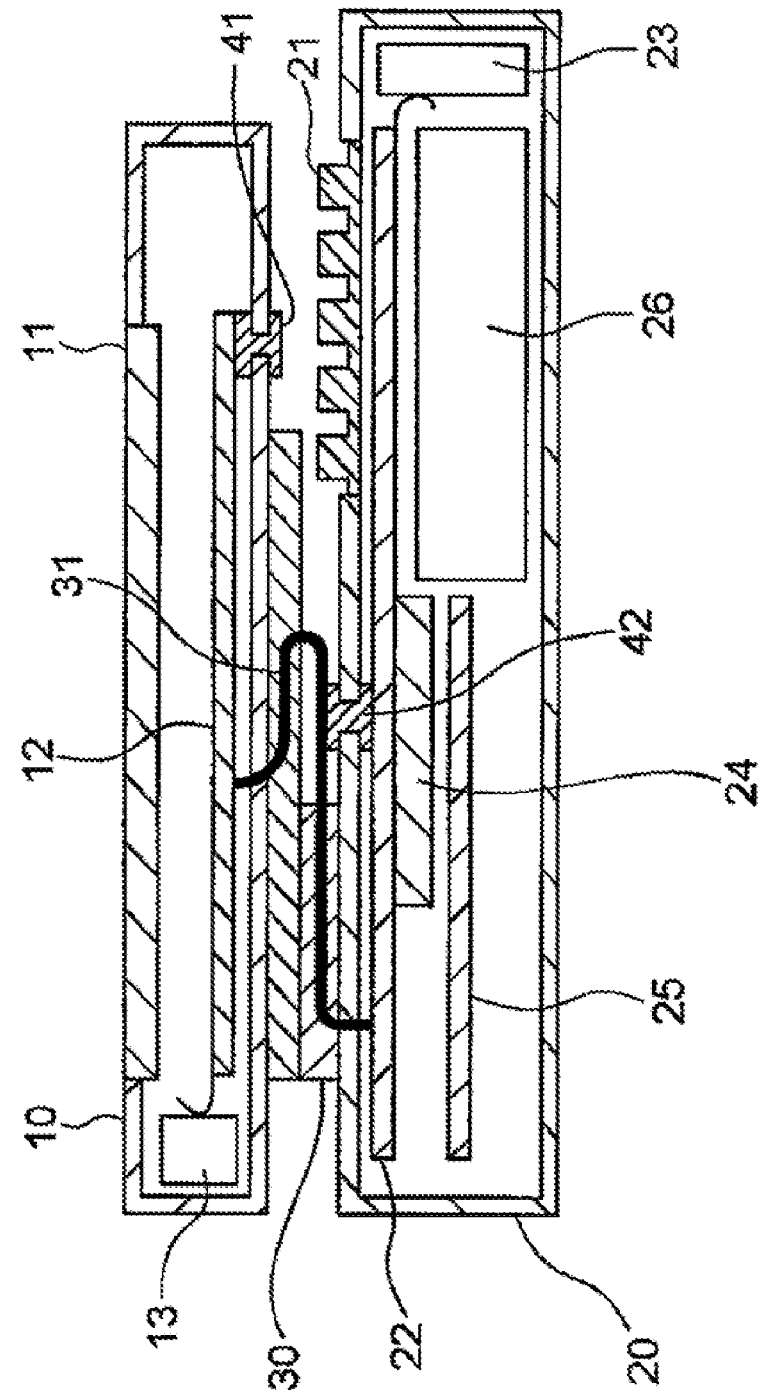
FIG. 1 is a sectional side view of a portable communication device according to a first embodiment, showing the case where the slide state is a closed state.
Figure 2:
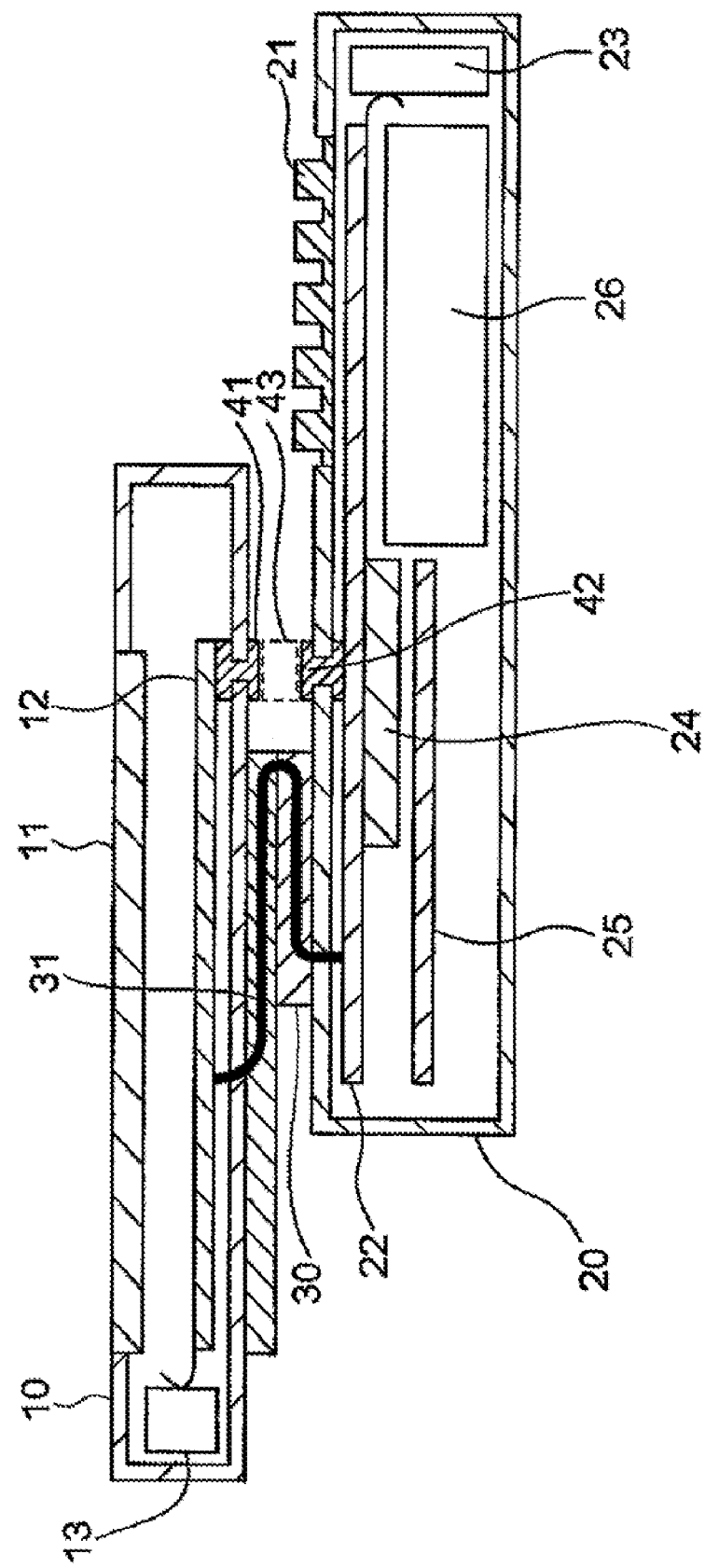
FIG. 2 is a sectional side view of the portable communication device according to the first embodiment, showing the case where the slide state is an open state.
Figure 3:
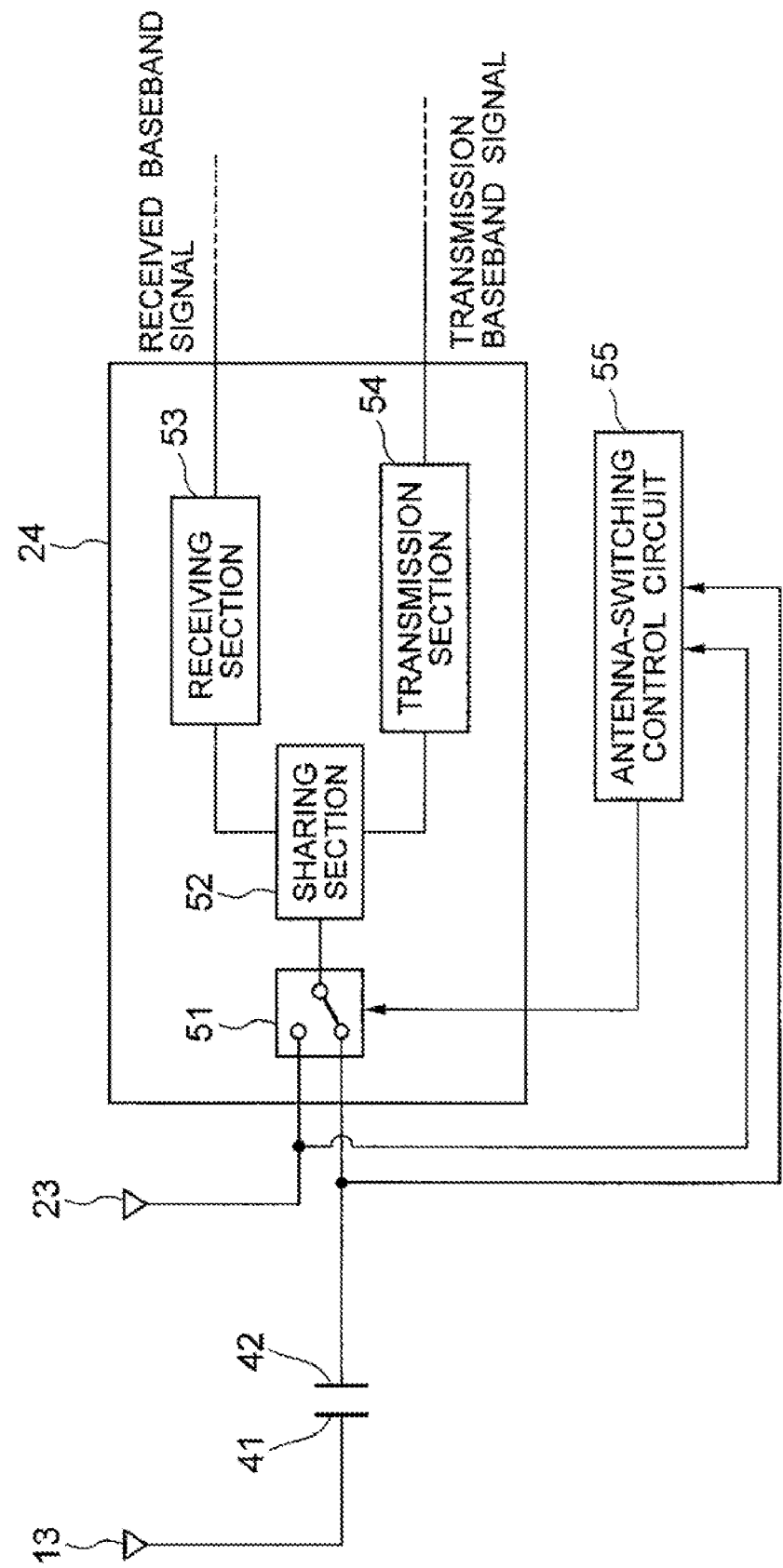
FIG. 3 is a diagram showing the circuit configuration of the portable communication device according to the first embodiment.
Figure 4:
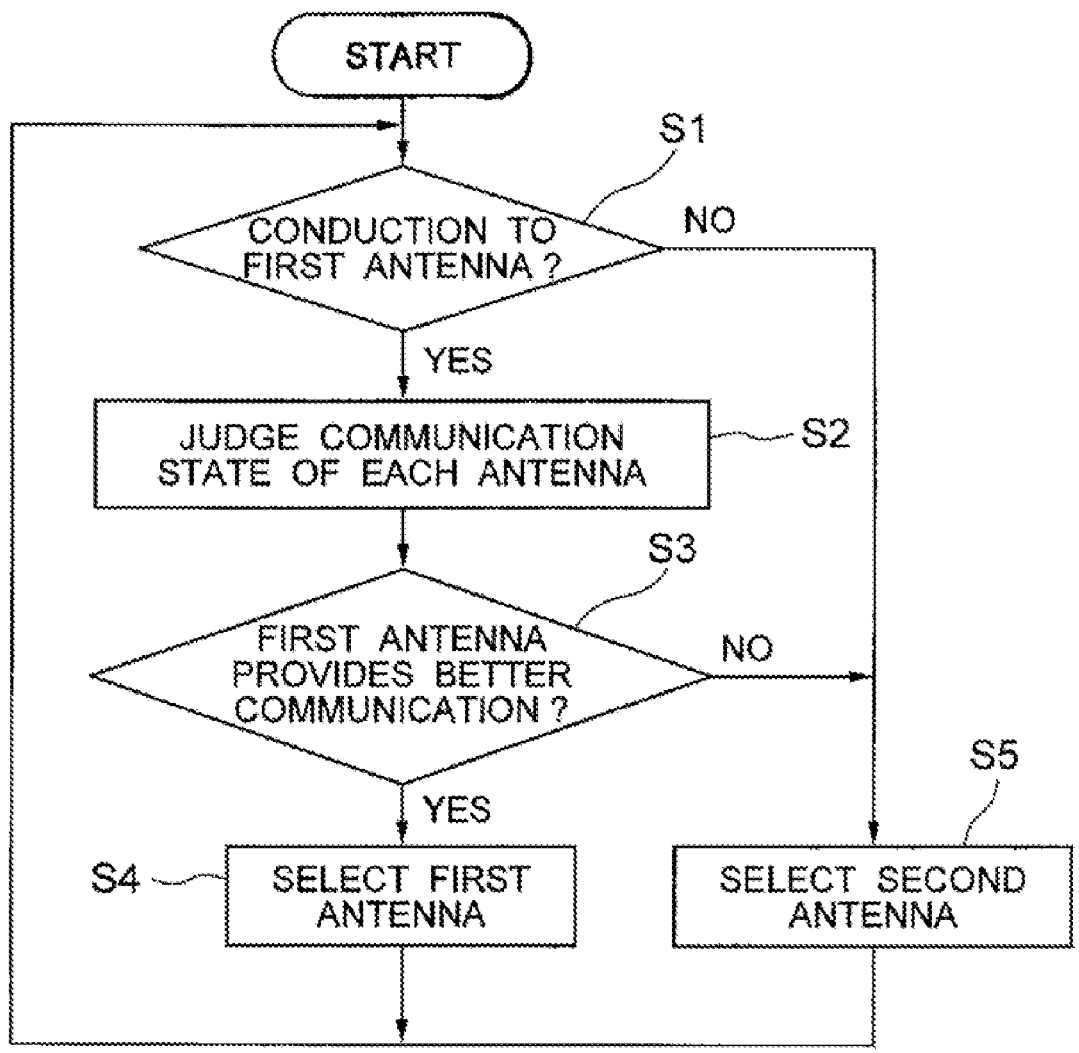
FIG. 4 is a flowchart showing the process of the portable communication device according to the first embodiment.

A portable communication device according to a first embodiment of the present invention will be described with reference to FIGS. 1 to 4. FIGS. 1 and 2 show the longitudinal sectional view of the portable communication device in the open state wherein both the housings have a minimum overlapped area and in the closed state wherein both the housings have a maximum overlapped area, respectively. FIG. 3 is a circuit diagram of the portable communication device. FIG. 4 is a flowchart showing the process of the portable communication device.

As shown in FIGS. 1 and 2, the portable communication device according to the present embodiment includes a front housing (second housing) 10 located on the front side of the device, i.e., the top side of the drawing, and a rear housing (first housing) 20 located on the rear side of the device, i.e., bottom side of the drawing, wherein both the housings are placed one on another. The portable communication device also includes a slide mechanism 30 disposed between the opposing surfaces of both the housings. Both the housings are coupled together by the slide mechanism 30 so that one of the housings slidably moves relative to the other of the housings.

The front housing 10 includes an LCD unit 11 on the front side of the housing, and includes within the housing a printed circuit board 12 and a first antenna 13 connected to the printed circuit board 12. The rear housing 20 includes a keyboard 21 on the front side of the housing, and includes within the housing a battery 26, two printed circuit boards 22, 25, a wireless circuit 24 mounted on the printed circuit board 22, a second antenna 23 connected to the printed circuit board 22 and also connected to the wireless circuit 24. The printed circuit board 12 in the front housing 10 and the printed circuit board 22 in the rear housing 20 are connected together by a flexible printing cable (FPC) 31.

The first antenna 13 is disposed in the vicinity of an end of the front housing 10, which is a portion of the front housing 10 farthest from the rear housing 20 in an open state effected by the slide mechanism as shown in FIG. 2. The second antenna 23 is disposed on the bottom end of the rear housing 20. In other words, the first antenna 13 and the second antenna 23 are disposed on the locations that are farthest from each other in the portable communication device.

The front housing 10 and rear housing 20 include on the opposing surfaces thereof electrode plates 41 and 42, respectively, which configure a pair of electrodes. Electrode plate 41 is disposed in the vicinity of the bottom end of the front housing 10 or at the location in the vicinity of the center of the rear housing 20 that opposes the bottom end in an open state. Electrode plate 42 is disposed in the vicinity of the center of the rear housing 20.

Due to the above configuration, the electrodes 41, 42 in pair oppose each other with a specific gap disposed therebetween when the housings 10, 20 are in an open state. In this state, a capacitive coupling shown by a dotted line in FIG. 2 is generated between the electrodes 41, 42. The printed circuit board 12 in the front housing 10 and the printed circuit board 25 in the rear housing 20, which are connected to the electrodes 41 and 42, respectively, are connected together without contact. As a result, the first antenna 13 and the wireless circuit 24 are connected together without wires, whereby a high frequency signal transmission is achieved between the first antenna 13 and the wireless circuit 24. In this configuration, the electrode pair 41, 42 functions as a noncontact switching member that connects together the first antenna 13 and wireless circuit 24 in a noncontact manner.

Hereinafter, the circuit configuration of the portable communication device as described above will be described with reference to FIG. 3. The wireless circuit 24 includes an antenna changeover switch 51, a sharing section 52, a receiving section 53, and a transmission section 54. An antenna-switching control circuit 55 that receives a switching control signal for the antenna changeover switch 51 is disposed in one of the printed circuit boards 12, 22 and 25. The antenna-switching control circuit 55 acquires a received signal from each of the first antenna 13 and the second antenna 23, and has a communication-state detection function that detects the communication state. The communication-state detection function judges which antenna provides a better communication state based on, for example, the received signal strength received from each of the antennas 13 and 23. The antenna-switching control circuit 55 selects one of the antennas 13, 23 that provides a better communication state, and transmits a switching control signal to the antenna-changeover switch 51 so as to connect the selected antenna to the wireless circuit 24.

The sharing section 52 connects the antenna selected by the antenna-changeover switch 51 to the receiving section 53 or transmission section 54. The sharing section 52 transmits to the receiving section 53 the signal received by the selected antenna during a receiving operation, and the receiving section generates a receiving baseband signal from the received signal. The sharing section 52 transmits through the selected antenna the transmission signal generated by the transmission section 54 from a transmission baseband signal during a transmission operation. The method of detecting the communication state by the antenna-switching control circuit 55 as described above is an example, and any configuration or technique may be used to detect the communication state of the first antenna 13 and second antenna 23.

Next, operation of the above portable communication device will be described with reference to FIGS. 1 and 2 as well as the flowchart of FIG. 4. As shown in FIG. 1, when the front housing 10 covers the keyboard 21 of the rear housing 20, the wireless circuit 24 is connected only to the second antenna 23 that is connected to the printed circuit board 25 on which the wireless circuit 24 is mounted. Thus, the portable communication device is in the state of step S5 of transmitting/receiving a radio signal through the second antenna 23.

When the user allows the front housing 10 to slide relative to the rear housing 20 for performing a key input operation, as shown in FIG. 2, to cause an open state wherein the keyboard 21 is exposed, the electrode plate 41 disposed in the front housing 10 and the electrode plate 42 disposed in the rear housing 20 oppose each other. At this stage, a capacitive coupling occurs between the electrode plates 41 and 42 in pair, whereby the electrode plates 41 and 42 are coupled together without wires. Thus, the first antenna 13 installed in the front housing 10 and the wireless circuit 24 mounted on the printed circuit board 22 are connected together. The wireless circuit 24 intermittently judges whether or not the first antenna is connected (step S1), and this connection allows the process to advance from step S1 to step S2.

In step S2, the wireless circuit 24 investigates the communication state of each of the first antenna 13 and the second antenna 23 to judge the communication quality of both the antennas. At this stage of the judgment, the first antenna 13 is apart from the rear housing 20 due to the open state caused by the slide movement, whereby the first antenna 13 is exposed from the slide mechanism 30 and the rear housing 20 to have a higher sensitivity. If the user performs a key input operation in the open state of the housings, the user grasps the rear housing 20 by hand, thereby reducing the sensitivity of the second antenna 23 provided on the bottom end. Thus, the communication quality of the first antenna further becomes relatively higher than that of the second antenna.

The wireless circuit 24 compares the communication quality between both the antennas (step S3), and judges that the first antenna 13 provides a better communication state. Thus, the process advances from step S3 to step S4, wherein the antenna-switching control circuit 55 provides a control signal to the antenna changeover switch 51 so as to select the first antenna 13. Accordingly, the first antenna 13 is connected to the wireless circuit 24, whereby the transmission/reception is performed through the first antenna 13.

On the other hand, since the housings are in a closed state in step S1, if the first antenna 13 is not conducted to the wireless circuit 24, or if the second antenna 23 provides a better communication state even when the housings are in an open state in step S3, the process advances to step S5, wherein the antenna-switching control circuit 55 selects the second antenna 23 whereby the antenna changeover switch 51 switches the connection to the second antenna 23.

As described heretofore, in the portable communication device of the first embodiment, the connection between the first antenna 13 disposed in the front housing 10 and the wireless circuit 24 disposed in the rear housing 20 is realized by a noncontact connection that is referred to as capacitive coupling through the pair of electrodes 41, 42. Accordingly, it is not needed to provide a cable for connection to the antenna between the housings 10, 20 in pair. This achieves a smaller and thinner structure of the portable communication device. Moreover, since the connection part for connecting the antenna to the wireless circuit is achieved by a noncontact connection even when the housings 10, 20 in pair are in an open state, the slide movement of the housings is smooth, and in addition there is no ablation in the connection part whereby the endurance of the antenna circuit is improved and stability of the communication can be achieved.

<Second Embodiment>

Figure 5:
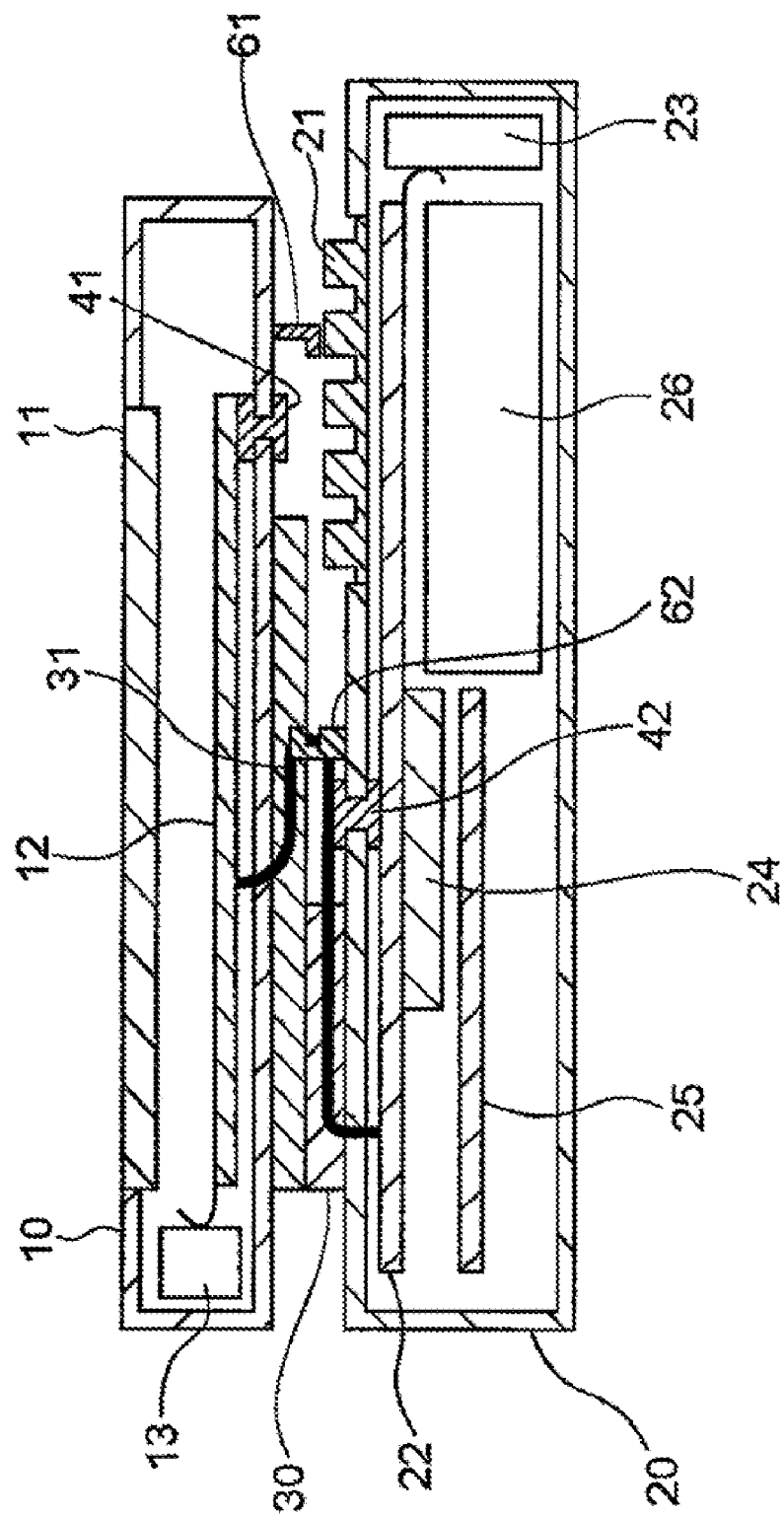
FIG. 5 is a sectional side view of a portable communication device according to a second embodiment, showing the case where the slide state is a closed state.
Figure 6:
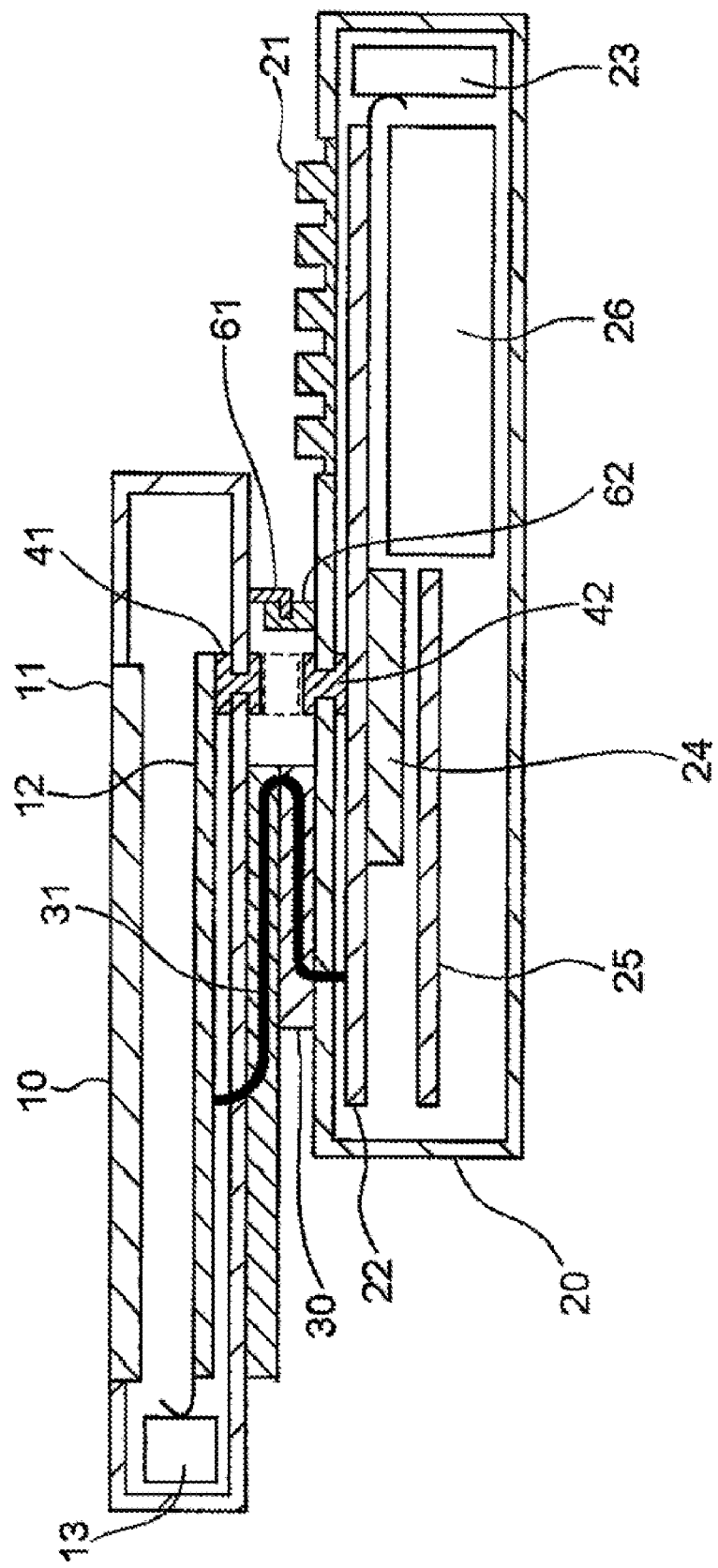
FIG. 6 is a sectional side view of the portable communication device according to the second embodiment, showing the case where the slide state is an open state.

Next, a second embodiment of the present invention will be described with reference to FIGS. 5 and 6. FIGS. 5 and 6 show the longitudinal section of the portable communication device in a closed state and an open state, respectively.

The portable communication device of the present embodiment includes, in addition to the configuration of the portable communication device of the first embodiment, a latch mechanism including a pair of latch members 61, 62 (gap fixing member) that fix the gap between the front housing 10 and the rear housing 20 that slidably open or close. More concretely, as shown in FIG. 5, the latch mechanism includes, roughly at the center of the rear housing 20, latch member 62 including a depression having an opening directed toward the bottom end, and also includes, as shown in FIG. 6, at the bottom end of the front housing 10, a larch member 61 including a projection that protrudes toward the top end. These latch members 61 and 62 in pair are such that the projection of latch member 61 provided on the front housing 10 engages with the depression of latch member 62 provided on the rear housing 20 when the housings 10, 20 are in an open state. In this way, the relative engagement of the latch members 61, 62 in pair allows generation of a stable capacitive coupling between the electrode plates 41 and 42, thereby fixing the gap between the electrode plates 41, 42 so that the electrode plates 41, 42 are coupled together without wires.

Due to the above configuration, a stable connection state is achieved through the pair of electrode plates 41, 42 between the first antenna 13 disposed in the front housing 10 and the wireless circuit 24 disposed in the rear housing 20. Thus, a further stable communication state can be attained.

<Third Embodiment>

Figure 7:
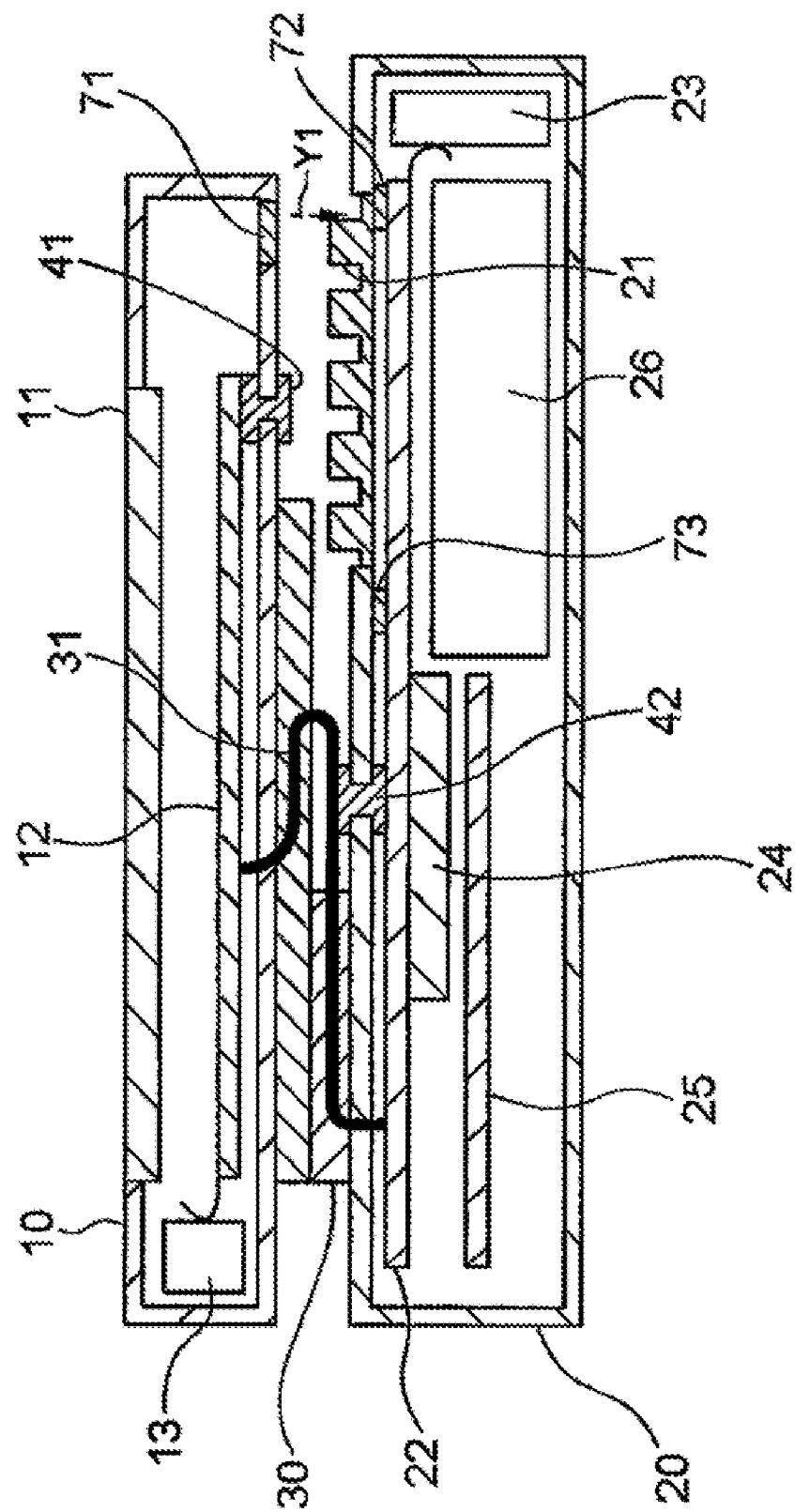
FIG. 7 is a sectional side view of a portable communication device according to a third embodiment, showing the case where the slide is a closed state.
Figure 8:
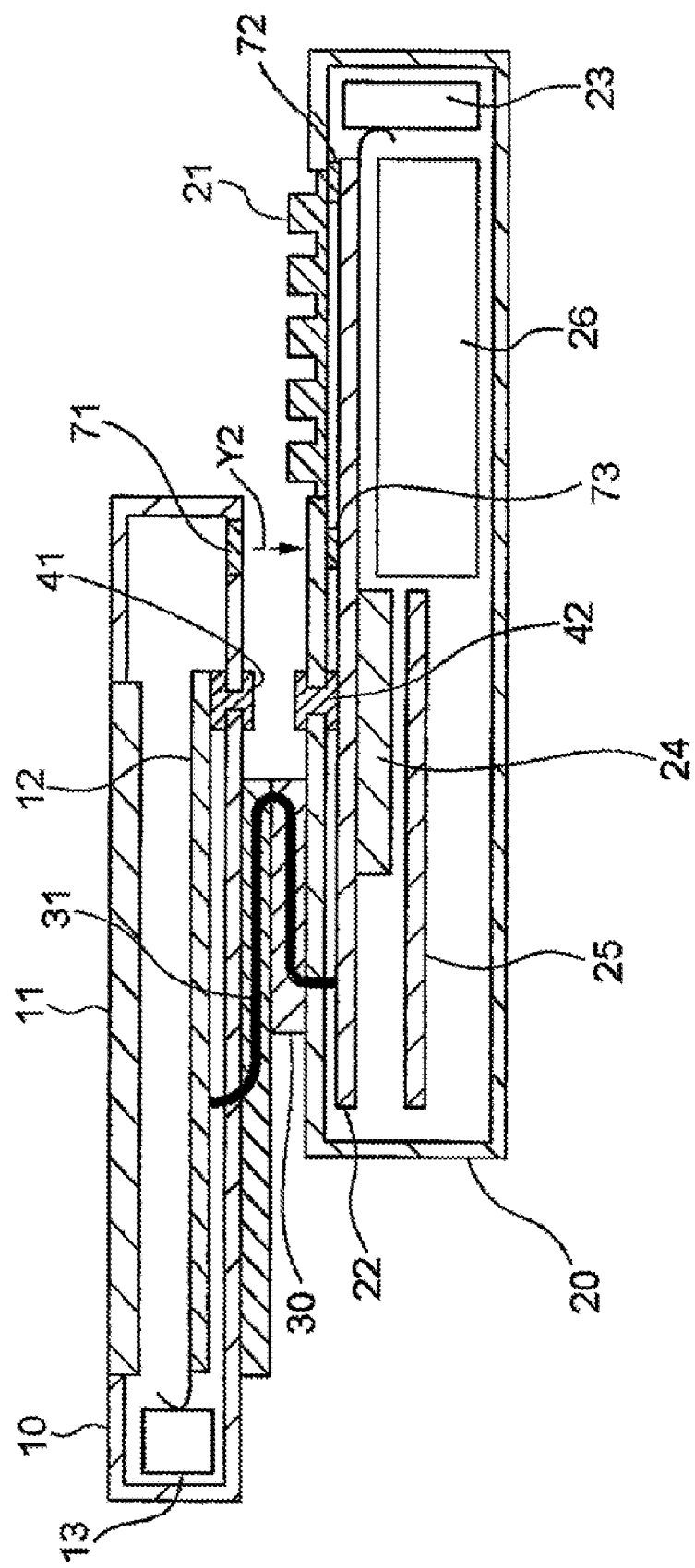
FIG. 8 is a sectional side view of the portable communication device according to the third embodiment, showing the case where the slide state is an open state.
Figure 9:
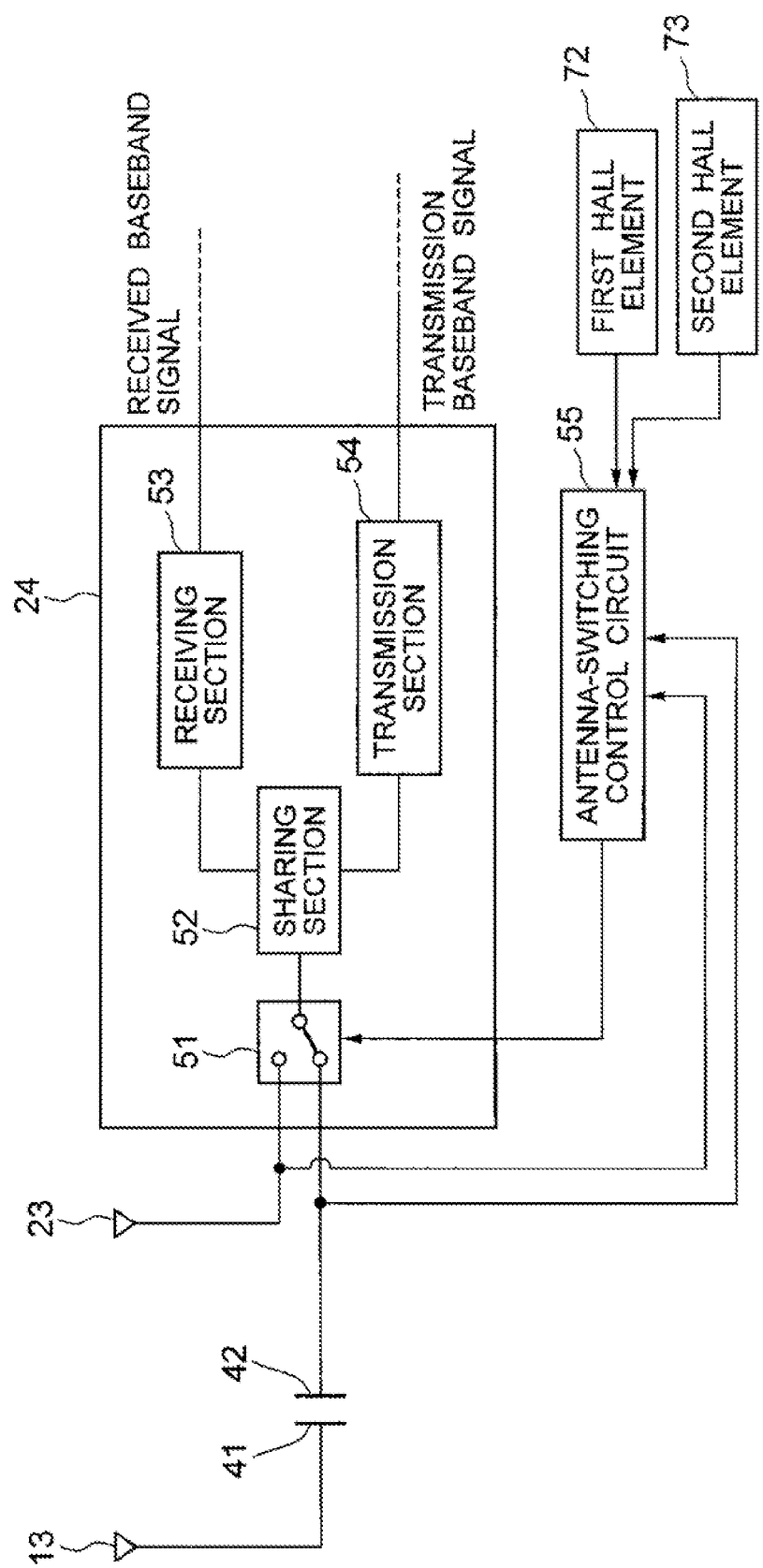
FIG. 9 is a diagram showing the circuit configuration of the portable communication device according to the third embodiment.
Figure 10:
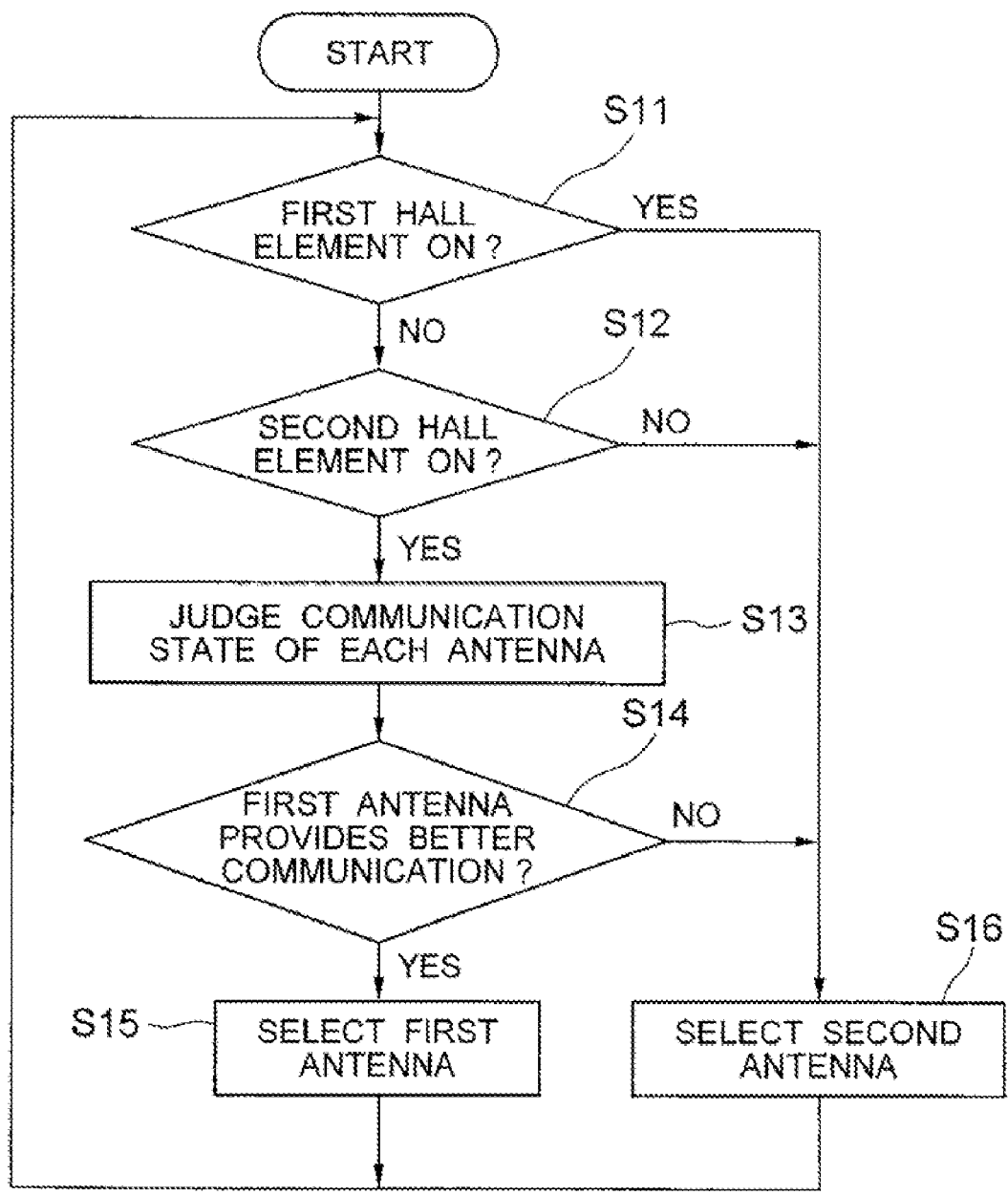
FIG. 10 is a flowchart showing the process of the portable communication device according to the third embodiment.
Figure 11:
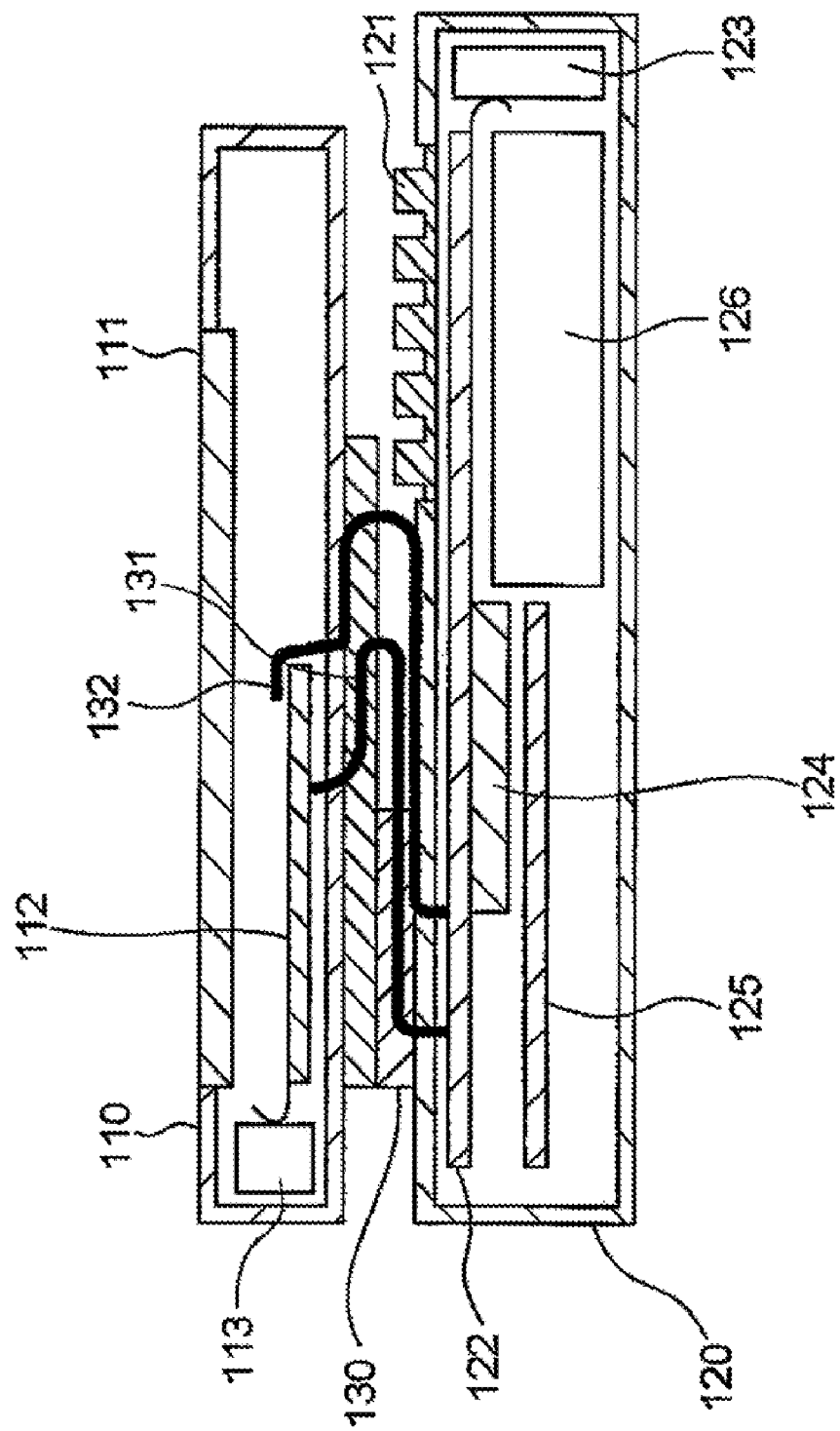
FIG. 11 is a sectional side view of a portable communication device relevant to the present invention, showing the case where the slide state is a closed state.
Figure 12:
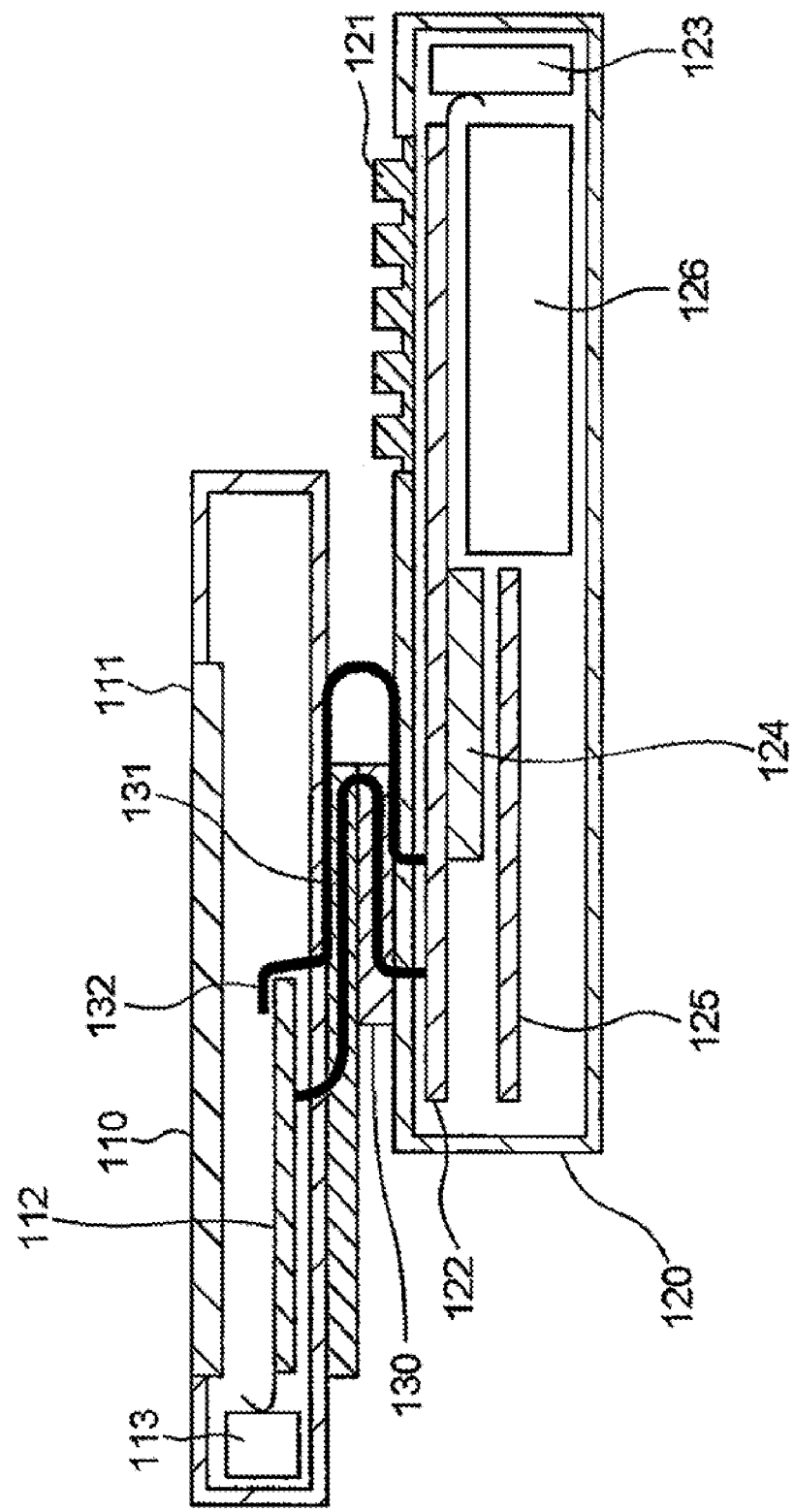
FIG. 12 is a sectional side view of the portable communication device shown in FIG. 11 in the case where the slide state is an open state.
Figure 13:
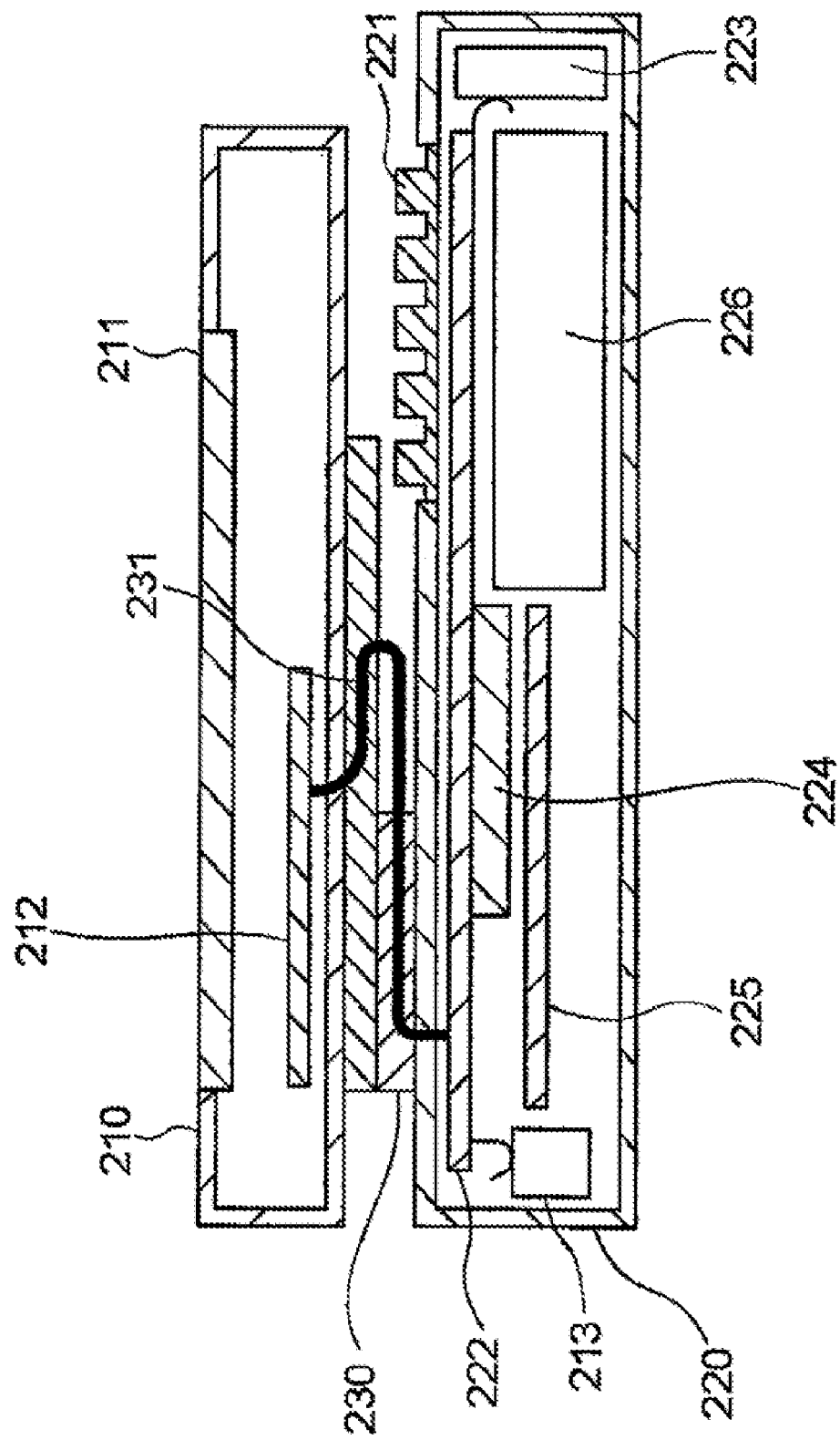
FIG. 13 is a sectional side view of another portable communication device relevant to the present invention, showing the case where the slide state is a closed state.
Figure 14:
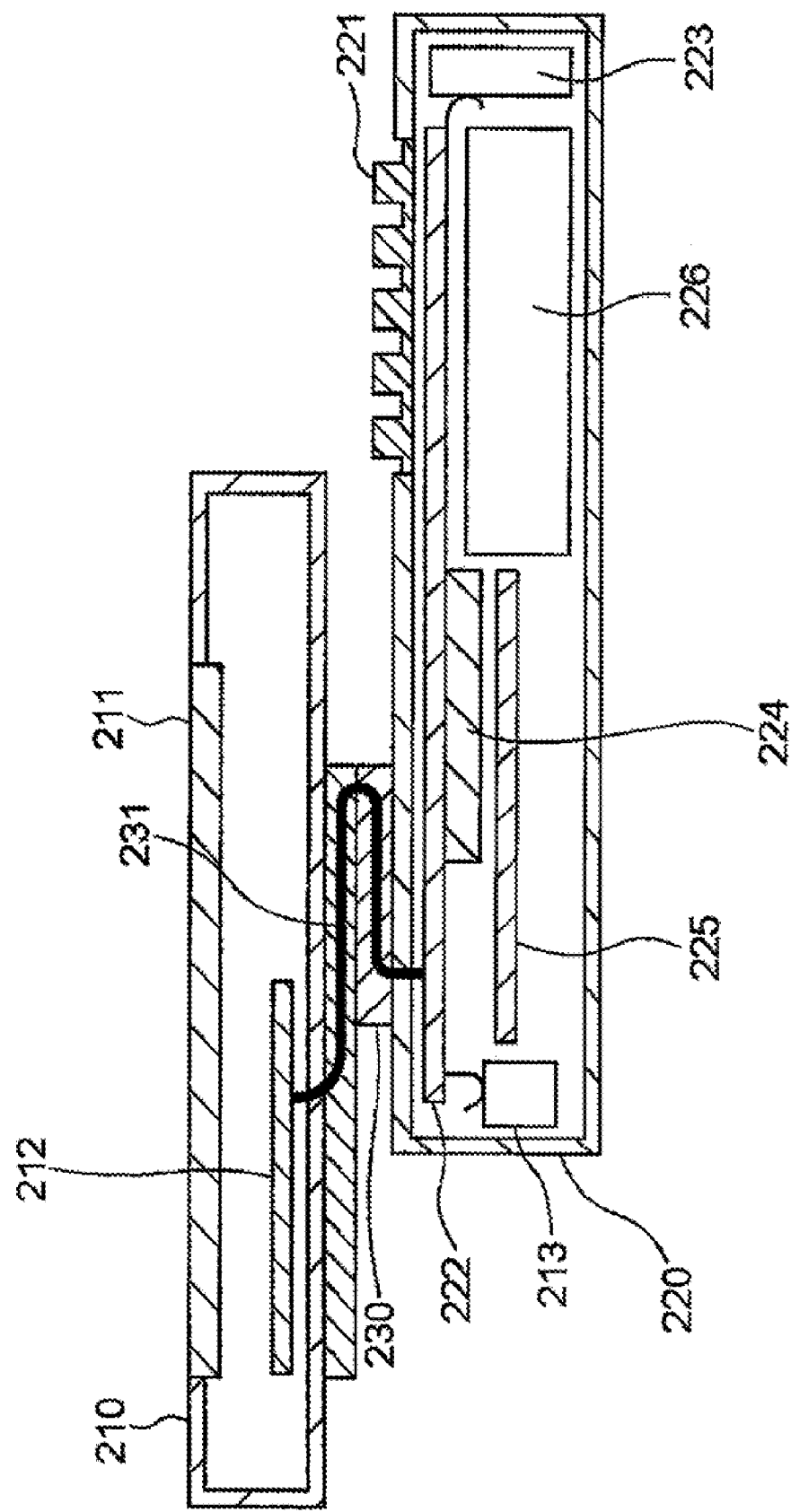
FIG. 14 is a sectional side view of the portable communication device shown in FIG. 11 in the case where the slide state is an open state.

Next, a third embodiment of the present invention will be described with reference to FIGS. 7 to 10. FIGS. 7 and 8 show the longitudinal section of the portable communication device in a closed state and an open state, respectively, of the housings. FIG. 9 is a circuit diagram of the portable communication device. FIG. 10 is a flowchart showing the process of the portable communication device.

The portable communication device of the present embodiment includes, in addition to the configuration of the portable communication device of the first embodiment, a housing-state detection member that detects whether the housings 10 and 20 in pair are in a closed state or an open state. The housing-state detection member is provided on the opposing surfaces of the housings 10, 20 in pair. More concretely, as shown in FIG. 7, the housing-state detection member is configured by a magnet (magnetic-field generation member) 71 provided on the bottom end of the front housing 10, and first and second hall elements (magnetic-field detection members) 72 and 73 disposed on the bottom end and roughly the center, respectively, of the rear housing 20.

As shown in FIG. 7, when both the housings 10 and 20 are in a closed state, the magnet 71 and the first hall element 72 are located in proximity to each other, whereby the first hall element 72 detects the magnetic flux Y1 generated from the magnet 71 to thereby detect the closed state. As shown in FIG. 8, when both the housings 10, 20 are in an open state, the magnet 71 and the second hall element 73 are in proximity to each other, whereby the second hall element 73 detects the magnetic flux Y2 generated from the magnet 71 to thereby detect the open state.

As shown in FIG. 9, the result of detection by the first and second hall elements 72, 73 are input to the antenna-switching control circuit 55 which delivers the switching control signal that controls the antenna changeover switch 51. The antenna-switching control circuit 55 receives a received signal through the first antenna 13 and the second antenna 23, detects the communication state thereof, and switches the antenna connected to the wireless circuit 24 based on the communication state and the open or closed state of the housings. For example, if both the housings 10 and 20 are in a closed state, the antenna-switching control circuit 55 switches so as to connect the second antenna 23 to the wireless circuit 24 at any time, whereas if both the housings are in an open state and the first antenna provides a better communication state, the antenna-switching control circuit 55 switches so as to connect the first antenna 13 to the wireless circuit 24.

The member that detects the state of both the housings 10 and 20 is not limited to the configuration of the magnet 71 and hall elements 72 and 73 such as described above. The member is not limited to the noncontact detection, and may be configured by a sensor etc. that generate a specific signal by a contact Upon occurring of an open state.

Next, operation of the above portable communication device will be described with reference to FIGS. 7 and 8 and the flowchart of FIG. 10. As shown in FIG. 7, in the closed state wherein the front housing 10 covers the keyboard 21 of the rear housing 20, the first hall element 72 can detect the magnetic flux from the magnet 71, to thereby detect the closed state. The antenna-switching control circuit 55 investigates in step S11 whether or not the first hall element 72 detects the magnetic flux (step S11), advances to step S16 if the flux is detected, and makes the switch to connect the second antenna 23 to the wireless circuit 24. This allows the portable communication device to transmit/receive radio signals through the second antenna 23.

If the user slidably moves the front housing 10 to thereby expose the keyboard 21 for performing a key input operation, as shown in FIG. 8, the antenna-switching control circuit 55 judges in step S11 that the first hall element 72 does not detect the magnetic flux from the magnet 71. Subsequently, the process advances to step S12 wherein the antenna control circuit judges whether or not the second hall element 73 detects the magnetic flux from the magnet 71. If the housings have shifted to an open state at this stage, the electrode plate 41 disposed in the front housing 10 and the electrode plate 42 disposed in the rear housing 20 oppose each other. Thus, a capacitive coupling occurs between the electrode plates 41 and 42 in pair, whereby the electrode plates 41, 42 are connected in a noncontact manner. In this way, the first antenna 13 installed in the front housing 10 and the wireless circuit 24 mounted on the printed circuit board 22 are connected together with radio wave.

If the second hall element 73 detects the magnetic flux in step S12, the fact of open state is detected, and the process advances to step S13, wherein the communication state of each antenna is judged. The communication states of both the antennas are compared against each other in step S14. If it is judged that the communication state of the first antenna is better, the process advances to step S15, wherein the antenna-switching control circuit 55 instructs the antenna changeover switch 51 to select the first antenna 13 (step S15). In this way, only the first antenna 13 is connected to the wireless circuit 24, whereby transmission/reception is performed through the first antenna 13. On the other hand, if it is judged that the communication state of the second antenna 23 is better in step S14, the second antenna 23 is selected even if the housings are in an open state (step S16).

If the slide shift movement of the housings in pair is stopped at the intermediate point of the slide mechanism, conduction between the electrode plates 41, 42 in pair is not obtained. If the first antenna 13 is erroneously selected in such a state, there arises a reflection of the transmission power output from the wireless circuit 24 at the open end to cause a circuit malfunction in the wireless circuit 24 in some cases, as well as the case wherein the received signal is not transmitted to the wireless circuit through the antenna. To prevent such a changeover of the switch, the process advances to step S16 if the second hall element 73 does not detect the open state, to thereby select the second antenna 23. Thus, it is possible to protect the wireless circuit 24 and to realize a more stable communication quality.

In the above embodiment, the configuration is such that the communication state of both the first antenna 13 and the second antenna 23 is further detected after detecting the open state of the housings, to thereby switch the antenna depending on this communication state. However, another configuration may be employed wherein the antenna is switched only based on the state of the housings. In this case, if the housings are in an open state, for example, the second antenna 23 is selected by switching, whereas if the housings are in a closed state, the first antenna 13 is selected by switching without consideration of the communication state.

In the above embodiment, the case is exemplified wherein the rear housing includes the second antenna. However, it is not needed in the present invention that the rear housing necessarily include the second antenna. In addition, an example is described wherein the rear housing includes the wireless circuit and the front housing includes the first antenna. However, the first antenna and the wireless circuit may be provided to the rear housing and the front housing, respectively. Similarly, the magnet (hall element) may be provided to any of the housings as the housing-state detection member.

While the invention has been particularly shown and described with reference to exemplary embodiment thereof, the invention is not limited to these embodiments and modifications. As will be apparent to those of ordinary skill in the art, various changes may be made in the invention without departing from the spirit and scope of the invention as defined in the appended claims.

The invention claimed is:

1. A portable communication device comprising:
a first housing and a second housing placed one on another;
a slide mechanism that allows said second housing to slidably move relative to said first housing between an open state wherein both said housings have a minimum overlapped area and a closed state wherein both said housings have a maximum overlapped area;
a wireless circuit installed in said first housing;
a first antenna installed in said second housing;
a noncontact switching member that connects together said first antenna and said wireless circuit by a noncontact connection in said open state, and disconnects said noncontact connection at least in said closed state; and
a housing-state detection member that detects whether both said housings are in said open state or said closed state,
wherein:
said first housing further includes a second antenna connected to said wireless circuit;
said portable communication device further comprises an antenna switching member that selectively connects said first antenna or said second antenna to said wireless circuit, and
said antenna switching member connects together said wireless circuit and said second antenna after said housing-state detection member detects said closed state.

2. The portable communication device according to claim 1, wherein said noncontact switching member includes a pair of electrodes respectively connected to said wireless circuit and said first antenna, said pair of electrodes connecting together said first antenna and said wireless circuit by a capacitive coupling that occurs between said electrodes upon opposing of said electrodes to each other.

3. The portable communication device according to claim 2, wherein said first and second housings include a pair of gap fixing members that fix a gap between both said of housings.

4. The portable communication device according to claim 3, wherein said gap fixing member fixes a gap between said pair of electrodes.

5. The portable communication device according to claim 1, further comprising a communication-state detection member that detects a communication state of said first antenna and said second antenna, wherein:
said antenna switching member connects said first antenna or said second antenna to said wireless circuit depending on a result of detection by said communication-state detection member.

6. The portable communication device according to claim 1, wherein said housing-state detection member includes a magnetic-field generation member provided in one of said first and second housings, and a magnetic-field detection member provided in the other of said first and second housings.

7. The portable communication device according to claim 1, wherein said first antenna is disposed in a vicinity of a portion of said second housing that is farthest from said first housing when both said housings are in said open state.

* * * * *